Oct. 6, 1959  K. K. NEWSOM  2,907,561
EXTRACTION AND FILTERING APPARATUS
Filed Sept. 23, 1957
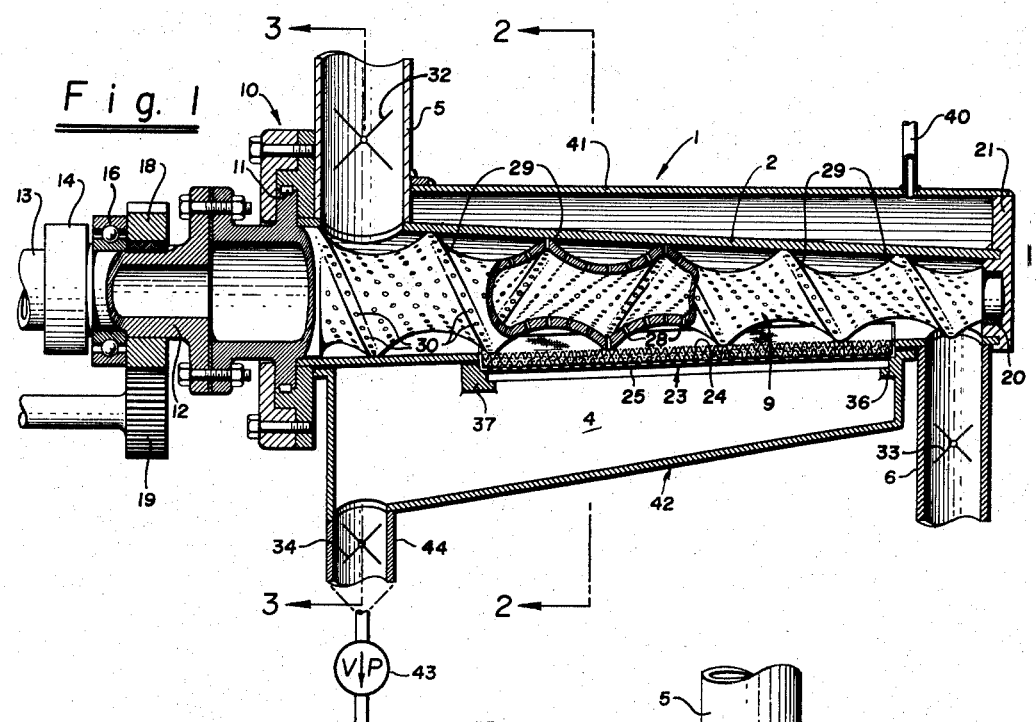
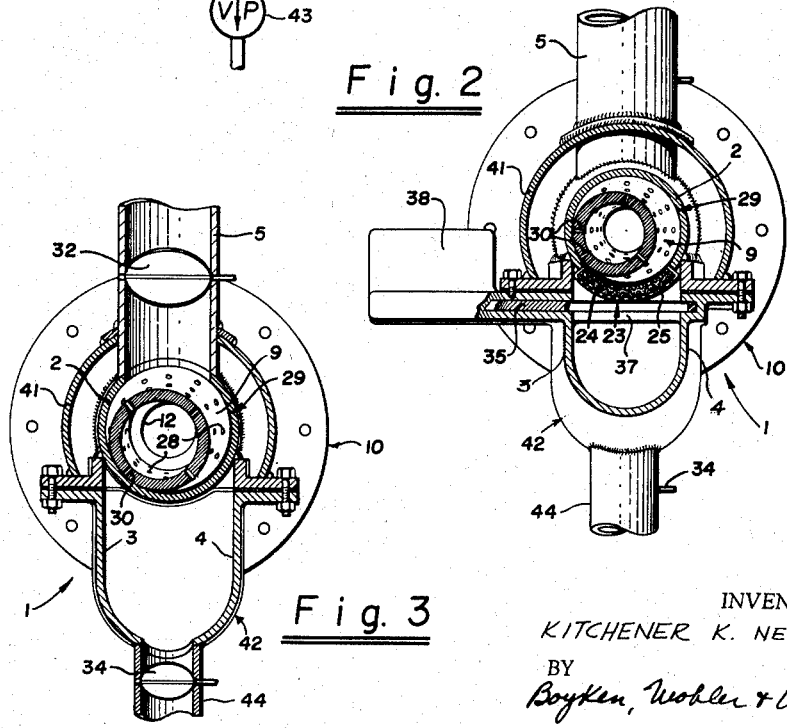
INVENTOR.
KITCHENER K. NEWSOM
BY
Boyken, Mohler & Wood.
Attorneys

United States Patent Office 2,907,561
Patented Oct. 6, 1959

2,907,561

EXTRACTION AND FILTERING APPARATUS

Kitchener K. Newsom, San Francisco, Calif.

Application September 23, 1957, Serial No. 685,726

6 Claims. (Cl. 266—12)

This invention relates to extraction and filtering apparatus and more particularly to a device lending itself to a hydro-metallurgical process by which selected materials may be separated from gangue or slurry. However it will be apparent that the apparatus will be applicable to various mixing, washing and separating processes.

The main object of the invention is the provision of an apparatus for extracting selected materials from solids and slurries in a more efficient and speedier manner than has heretofore been possible.

Another object of the invention is an extraction and filtering apparatus for use in a continuous, as distinguished from a batch process.

Still another object of the invention is a mixing apparatus by which a more intimate mixing of materials may be effected.

Another object of the invention is the provision of a filtering device in which the filter bed or screen is subjected to a continuous cleaning action thus precluding caking of material on the filter or clogging of the filter which would otherwise cause the filter to become inoperative.

Another object of the invention is the provision of an apparatus which may be employed in various mixing and extracting processes and by which a wide range of controlled pressures and temperatures are possible and by which oxidation of the materials may be obviated.

Other objects and advantages will be seen from the following specification and from the claims.

Fig. 1 is a semi schematic longitudinal section through the preferred form of the apparatus.

Fig. 2 is a vertical cross section as taken along lines 2—2 of Fig. 1.

Fig. 3 is a vertical cross section through lines 3—3 of Fig. 1.

In detail, the invention comprises an elongated housing generally designated 1 which is similar in some respects to a screw conveyor housing having an upper semicylindrical top portion 2 and lower generally vertical side walls 3,4 (Figs. 2, 3).

At the inlet end of the housing an inlet conduit 5 is provided through which raw materials such as ores, gangue and slurry may be discharged into the housing by gravity. At the opposite end of the housing 1 a discharge conduit 6 is provided for gravity flow therethrough of the treated materials.

Rotatably supported within the housing 1 is a hollow helical flight or screw 9 which is supported at the inlet end in a head 10 provided with a fluid seal 11. Bolted to the end of the flight 9 is a pipe section 12 through which fluid may be pumped into the interior of the screw. A fixed conduit 13 may be connected to the rotating section 12 by a conventional coupling 14 including a packing box.

Bearing 16 may be provided adjacent coupling 14 for rotatably supporting the weight of the flight at the inlet end.

Rotation of the flight 9 is effected by a gear 18 fixed to pipe section 12 which in turn may be driven by any conventional means such as pinion 19. The opposite or discharge end of the flight may be rotatably supported in a bearing 20 supported by the end plate 21 of the housing 1.

In those instances where a build up in pressure on the material in housing 1 is desired, the housing 1 and flight 9 may taper to a smaller diameter from the inlet end to the outlet end as shown in Fig. 1. However it is to be understood that the present invention encompasses the use of purely cylindrical members in which case pressure is not built up by the screw itself.

The housing 1 is imperforate for a portion of its length from the inlet 5 toward outlet 6 (Fig. 3). However the cylindrical portion of the housing is open along its lower side for a considerable portion of its length and a filter 23 is positioned in the opening so that the screw 9 at its major diameter is in wiping engagement with said filter.

The filter 23 may be of any desired material adapted for the particular process employed although a canvas 24 backed up by a screen 25 is shown in the drawings (see Figs. 1, 2).

As stated above, the flight on screw 9 is hollow and fluid under pressure from fixed conduit 13 may be pumped into the interior of the flight. For the purpose of providing an intimate mixing effect between the fluid and whatever raw materials enter the housing 1 from inlet 5 the flight 9 is perforated with a plurality of holes 28 from which the fluid is injected into the materials occupying the helical space between the flight and the inner sidewalls of housing 1.

It will be understood that the screw or flight 9 is formed with a helical ridge 29 constituting the maximum diameter of the screw and which ridge is in wiping engagement with the sidewalls of the housing and, in addition, in wiping engagement with the screen for a portion of its length.

An extremely important feature of the present invention is the provision of additional holes or jets 30 in the ridge portion 29 of the screw. The fluid emanating from the ridge holes 30, in addition to performing the function of effecting intimate mixing with the materials in the conveyor housing also has the desirable effect of clearing particles of solid material from between the ridge and the housing. The fluid emanating from holes 30 also performs the more important function of keeping the filter 23 free from clogging action.

In many instances it has been found that the filter 23 is rendered useless after a short period of time (especially when materials tending to cake are being processed) if holes 30 are not provided on the wiping edge or ridge 29 of flight 9.

In some instances it may be found that the holes 28 between the ridge 29 can be dispensed with but, if a filter screen is employed, it is necessary to employ holes 30 unless the materials handled are completely non-clogging in character, which would be unusual.

An inlet valve schematically shown in Fig. 1 at 32 may be provided for controlling the flow of raw materials into the housing 1 and an outlet valve 33 may be provided in the discharge pipe 6.

In many instances it is desirable to be able to carry on the mixing process under pressure in which case housing 1 is provided with slides 36, 37 (Fig. 1) in which is reciprocably supported a slide or gate valve 35. The housing 38 for the gate valve 35 may be secured in any convenient manner to the screw housing 1 (Fig. 2) and may be operated manually or by any suitable power means.

A bottom 42 is provided in housing 1 connecting sidewalls 3, 4 and a discharge line 44 is employed to carry away the liquor passing through the filter 23. A valve 34 is inserted in outlet 44 to permit a build up of pressure in housing 1 if desired and, in the event that a reduction in pressure is required under filter 23 a vacuum pump 43 in the discharge line 44 may be provided as indicated schematically in Fig. 1.

The above described apparatus has been found to be extremely flexible in operation since the fluid employed may be any desired solution or gas and intimate mixing of the same with the raw materials from inlet 5 is insured by virtue of the outlets in screw 9. Furthermore, the provision of holes in the maximum diameter ridge 29 of the screw 9 insures continuous cleaning of the filter 23 to prevent clogging.

A jacket 41 (Fig. 1) around housing 1 may be provided in the event that an elevated temperature required to hasten the extraction or separation process in which case steam may be introduced into said jacket through conduit 40.

It will be understood that the invention is not restricted to any particular materials or fluid although the apparatus has been employed with success in hydrometallurgical processes by which ore is treated with heated water in which various chemicals have been dissolved depending on the values to be extracted. In such a case the valuable materials are in the filtrate passing through screen 23 and which materials may, in a subsequent process, be separated from the liquid carrier.

The invention is not to be taken as restricted to the exact apparatus disclosed as it is obvious that various modifications will occur to those skilled in the art without departing from the invention defined in the following claims.

I claim:

1. A device of the character described comprising an elongated tube, a hollow perforated screw conveyor flight in said tube coaxial therewith, means for feeding raw material into said tube for movement from one end of said tube toward the opposite end upon rotation of said flight, means for so rotating said flight, means for conducting fluid under pressure into said perforated flight for ejection outwardly thereof through the perforations in said flight whereby said fluid is mixed with said raw material during movement of the latter, said screw conveyor flight being formed to provide a helical ridge defining the major diametral extent of said flight, said ridge being in wiping engagement with inner side wall of said tube at points along the length of the latter, some of said perforations being formed in said ridge.

2. A device of the character described comprising an elongated tube, a hollow perforated screw conveyor flight in said tube coaxial therewith, means for feeding raw material into said tube for movement from one end of said tube toward the opposite end upon rotation of said flight, means for so rotating said flight, means for conducting fluid under pressure into said perforated flight for ejection outwardly thereof through the perforations in said flight whereby said fluid is mixed with said raw material during movement of the latter, said screw conveyor flight being formed to provide a helical ridge defining the major diametral extent of said flight, said ridge being in wiping engagement with inner side wall of said tube at points along the length of the latter, some of said perforations being formed in said ridge, said tube being provided with a filter along a portion of its side wall to permit movement therethrough of fluid from said tube, said ridge of said flight being in wiping engagement with said filter along the length of the latter.

3. A mixing and filtering apparatus comprising an elongated tube having an inlet at one end and an outlet at its opposite end, a hollow screw conveyor flight in said tube mounted for rotation about an axis extending longitudinally of said tube, means for rotating said flight, said flight being formed with a helical ridge defining the maximum diametral extent of said flight and arcuate side walls of smaller diameter than said ridge intermediate the helical turns of said ridge, said ridge being in wiping engagement with the inner side walls of said tube for advancing material within said tube from said inlet end toward said outlet end upon rotation of said flight, said side walls of said flight being formed with perforations therein, means for conducting fluid under pressure into said perforated flight for ejection outwardly thereof through said perforations, said ridge also being formed with perforations whereby fluid ejected therethrough impinges on said side walls for removing material from between said ridge and said side walls of said tube.

4. A mixing and filtering apparatus comprising an elongated tube having an inlet at one end and an outlet at its opposite end, a hollow screw conveyor flight in said tube mounted for rotation about an axis extending longitudinally of said tube, means for rotating said flight, said flight being formed with a helical ridge defining the maximum diametral extent of said flight and arcuate side walls of smaller diameter than said ridge intermediate the helical turns of said ridge, said ridge being in wiping engagement with the inner side walls of said tube for advancing material within said tube from said inlet end toward said outlet end upon rotation of said flight, said side walls of said flight being formed with perforations therein, means for conducting fluid under pressure into said perforated flight for ejection outwardly thereof through said perforations, said ridge also being formed with perforations whereby fluid ejected therethrough impinges on said side walls for removing material from between said ridge and said side walls of said tube, the side walls of said tube being provided with an opening therein, a filter received in said opening and conforming to the outline of said ridge whereby the latter is in wiping engagement with said filter during said rotation and whereby the fluid ejected from the openings in said ridge washes away material tending to form on said filter.

5. A mixing and filtering apparatus comprising an elongated tube having an inlet at one end and an outlet at its opposite end, a hollow screw conveyor flight in said tube mounted for rotation about an axis extending longitudinally of said tube, means for rotating said flight, said flight being formed with a helical ridge defining the maximum diametral extent of said flight and arcuate side walls of smaller diameter than said ridge intermediate the helical turns of said ridge, said ridge being in wiping engagement with the inner side walls of said tube for advancing material within said tube from said inlet end toward said outlet end upon rotation of said flight, said side walls of said flight being formed with perforations therein, means for conducting fluid under pressure into said perforated flight for ejection outwardly thereof through said perforations, means for closing said inlet and outlets to permit the building up of pressure or the reduction of pressure within said tube.

6. A mixing and filtering apparatus comprising an elongated tube having an inlet at one end and an outlet at its opposite end, a hollow screw conveyor flight in said tube mounted for rotation about an axis extending longitudinally of said tube, means for rotating said flight, said flight being formed with a helical ridge defining the maximum diametral extent of said flight and arcuate side walls of smaller diameter than said ridge intermediate the helical turns of said ridge, said ridge being in wiping engagement with the inner side walls of said tube for advancing material within said tube from said inlet end toward said outlet end upon rotation of said flight, said side walls of said flight being formed with perforations therein, means for conducting fluid under pressure into said perforated flight for ejection outwardly thereof through said perforations, the side walls of said tube being provided with an opening intermediate said ends, a filter positioned in said opening and conforming to the outline of said ridge whereby the latter is in wiping engagement with said filter during said rotation, a discharge conduit for filtrate communicating with said opening, means for closing said conduit to permit varying the pressure impressed upon said filter.

References Cited in the file of this patent

UNITED STATES PATENTS

| | | |
|---|---|---|
| 985,863 | Turner et al. | Mar. 7, 1911 |
| 2,399,710 | Schock | May 7, 1946 |